United States Patent [19]
Ketcham et al.

[11] Patent Number: 5,519,191
[45] Date of Patent: May 21, 1996

[54] FLUID HEATER UTILIZING LAMINAR HEATING ELEMENT HAVING CONDUCTIVE LAYER BONDED TO FLEXIBLE CERAMIC FOIL SUBSTRATE

[75] Inventors: Thomas D. Ketcham, Big Flats; Dell J. St. Julien, Watkins Glen, both of N.Y.; Willard A. Cutler, Goleta, Calif.

[73] Assignee: Corning Incorporated, Corning, N.Y.

[21] Appl. No.: 969,076

[22] Filed: Oct. 30, 1992

[51] Int. Cl.⁶ ............... H05B 3/10; H01C 3/00; F01N 3/10
[52] U.S. Cl. .......... 219/552; 219/549; 392/485; 338/211; 338/280; 338/314; 338/308; 29/611; 29/890; 60/300; 422/174
[58] Field of Search .............. 219/552, 553, 219/549, 543; 392/485, 486, 488, 490, 491–493, 495; 338/206, 211, 212, 208, 279, 280, 282, 292, 308, 314; 29/611, 890; 55/DIG. 30; 422/180, 174, 177, 171; 60/299, 300

[56] References Cited

U.S. PATENT DOCUMENTS

| | | | |
|---|---|---|---|
| 2,405,529 | 8/1946 | Smith | 175/41 |
| 2,600,485 | 6/1952 | Cox | 219/549 |
| 3,041,569 | 6/1962 | Werker | 219/543 |
| 3,163,841 | 12/1964 | Willett | 392/491 |
| 3,195,030 | 7/1965 | Herzog et al. | 317/258 |
| 3,265,865 | 8/1966 | Hager, Jr. | 219/549 |
| 3,490,887 | 1/1970 | Herzog et al. | 65/33 |
| 3,770,389 | 10/1973 | Kitzner et al. | 392/491 |
| 4,150,280 | 4/1979 | Hurko | 338/308 |
| 4,203,197 | 5/1980 | Crandell | 338/314 |
| 4,272,668 | 6/1981 | Johnson et al. | 392/491 |
| 4,301,324 | 2/1978 | Kumar | 174/68.5 |
| 4,318,888 | 3/1982 | Chapman et al. | 422/180 |
| 4,340,436 | 7/1982 | Dubetsky et al. | 156/89 |
| 4,505,726 | 3/1985 | Takeguchi | 55/282 |

(List continued on next page.)

FOREIGN PATENT DOCUMENTS 0123186  10/1984  European Pat. Off. .
0441528A1  8/1991  European Pat. Off. .
63-278833  11/1988  Japan .

OTHER PUBLICATIONS

J. G. Pepin et al., "Electrode–Based Causes of Delaminations in Multilayer Ceramic Capacitors", J. Am. Ceram. Soc., 72 [12] 2287–91 (1989).

K. G. Shaw, "Fabrication of Plasma Sprayed Composite Structures", Proc. American Society for Composites, Sixth Technical Conference, pp. 145–153, Technomic Publishing Company, Lancaster, Pa. (1991).

H. C. Cao et al., "On Crack Extension in Ductile/Brittle Laminates", Acta metall. mater. vol. 39, No. 12, 2997–3005, (Dec. 1991).

J. H. Givens et al., "Metal Matrix Composites: Titanium Nitride Films as Microlaminate Reinforcements", Metal & Ceramic Matrix Composites: Processing, Modeling & Mechanical Behavior, (R. B. Bhagat et al. Ed.), pp. 587–596, The Minerals, Metals & Materials Soc., 1990.

W. J. Clegg et al., "A simple way to make tough ceramics", Nature vol. 347, pp. 455–457 (4 Oct. 1990).

(List continued on next page.)

Primary Examiner—Bruce A. Reynolds
Assistant Examiner—John A. Jeffery
Attorney, Agent, or Firm—Kees van der Sterre

[57] ABSTRACT

Flow-through fluid heaters useful, e.g., for the preheating of exhaust gas streams prior to catalytic treatment thereof, are made by bonding an electrically conductive metallic film or foil to at least one pre-sintered flexible ceramic foil substrate to provide a flexible, electrically conductive ceramic/metallic heating element, that element then being formed into a crimped sheet or base sheet for incorporation into a honeycomb structure which includes a plurality of open channels extending from one surface of the structure to another surface of the structure, formed by one or more contacting combinations of crimped sheet and base sheet. Catalytic coatings may be applied to the preheaters to provide a heater/converter with very rapid light-off characteristics.

15 Claims, 2 Drawing Sheets

U.S. PATENT DOCUMENTS

| | | | |
|---|---|---|---|
| 4,535,589 | 8/1985 | Yoshida et al. | 60/303 |
| 4,563,383 | 1/1986 | Kuneman et al. | 428/901 |
| 4,569,878 | 2/1986 | Barrall et al. | 428/182 |
| 4,656,071 | 4/1987 | Virkar | 428/36 |
| 4,677,009 | 6/1987 | Virkar | 428/36 |
| 4,714,257 | 12/1987 | Heinrich et al. | 277/1 |
| 4,725,333 | 2/1988 | Leedecke et al. | 156/630 |
| 4,829,655 | 5/1989 | Cornelisen et al. | 29/527.4 |
| 4,835,656 | 5/1989 | Kitahara et al. | 361/321 |
| 4,868,711 | 9/1989 | Hirama et al. | 361/321 |
| 5,008,149 | 4/1991 | Taga et al. | 428/336 |
| 5,059,582 | 10/1991 | Chung | 505/1 |
| 5,063,029 | 11/1991 | Mizuno et al. | 422/175 |
| 5,089,455 | 2/1992 | Ketcham et al. | 501/104 |
| 5,094,074 | 3/1992 | Nishizawa et al. | 60/300 |
| 5,163,291 | 11/1992 | Hitachi et al. | 60/299 |
| 5,174,968 | 12/1992 | Whittenberger | 55/DIG. 30 |

OTHER PUBLICATIONS

D. B. Marshall et al., "Enhanced Fracture Toughness in Layered Microcomposites of Ce–ZrO2 and Al2O3", J. Am. Ceram. Soc., 74 [12] 2979–87 (1991).

M. Yasrebi et al., "Biomimetic Processing of Ceramics and Ceramic–Metal Composites" Mat. Res. Soc. Symp. Proc. vol. 180, pp. 625–635 (1990).

A. Bose et al., "MIMLCs: Microinfiltrated macrolaminated composites . . . ", Advanced Materials and Processes, Jul. 1991, pp. 19–22.

M. C. Shaw et al., "Bridging Processes in Metal–Reinforced Ceramics", Mat. Res. Soc. Symp. Proc. vol. 170, pp. 25–31, Materials Research Society (1990).

A. N. Virkar et al., "Strengthening of Oxide Ceramics by Transformation–Induced Stresses", J. Am. Ceram. Soc., 70 [3] 164–170 (1987).

R. A. Cutler et al., "Strength Improvement in Transformation–Toughened Alumina by Selective Phase Transformation", J. Am. Ceram. Soc. 70 [10] 714–718 (1987).

FLUID HEATER UTILIZING LAMINAR HEATING ELEMENT HAVING CONDUCTIVE LAYER BONDED TO FLEXIBLE CERAMIC FOIL SUBSTRATE

BACKGROUND OF THE INVENTION

The present invention relates generally to composite electrical flow-through heaters useful for heating fluids, e.g., gases, for a variety of applications. More particularly, the invention relates to electrical heating elements and methods useful as, or in combination with, cellular or honeycomb structures of the kind commercially used for gas filters or catalytic converters. Such heaters are useful to initiate faster catalyst "light-off" in effluent treatment systems such as automotive catalytic converters, diesel particulate filters, wood stove converters, industrial stacks, and a variety of other systems in which an exhaust gas stream temperature is otherwise too low to initiate catalytic conversion reactions.

Pollutants from automotive exhaust systems, in particular, continue to present a substantial environmental challenge. Catalytic converters have been very successful in reducing automotive exhaust pollution, but as pollution standards become more stringent, there is an increasing need for better and improved converters.

The Federal Test Procedure (FTP) is an emission certification test used on light-duty vehicles. Cold-start under FTP standards is the starting of an engine after a period of 12 to 36 hours of non-operation in a temperature environment of 20°–30° C. For most cold starts, there is a time span of one to two minutes between the time the emissions begin and the time the catalyst and substrate heat up sufficiently to reach the light-off temperature of the catalyst. This time span is referred to as the light-off time; the light-off temperature is taken to be that temperature at which 50% conversion of the pollutants present in the treated gas stream is achieved. For automotive catalytic converters this temperature is typically in the 200°–300° C. range.

Some estimates are that about half of all pollutants escaping into the atmosphere from a vehicle equipped with a catalytic converter are generated in these first two minutes following cold start-up. Therefore, by reducing the light-off time, a very significant reduction in total pollutant emissions could be achieved.

Modifications to automotive and other catalytic converters to reduce the light-off time by preheating the converter or the gas to be treated have been proposed. U.S. Pat. No. 5,063,029, for example, suggests the use of an extruded metal honeycomb structure as a gas preheater or heated catalyst support for an automotive emissions control system. U.S. Pat. No. 3,163,841 discloses an electrical heater comprising a ceramic honeycomb structure provided with a conductive coating.

The supplemental heating of exhaust or feed gas streams is also of interest for certain gas filtration applications, a typical example being particulate filters for diesel exhaust streams. In these applications, particulate carbon is removed from the waste gas stream by filtration, with subsequent air oxidation of the collected particulates. U.S. Pat. Nos. 4,505,726 and 4,535,589 suggest the use of electrically heated metal or other conductive components, including metallic films, in order to achieve the gas or substrate temperatures necessary to oxidize these particulates.

For these and many other fluid heating applications a dimensionally stable heating element which can withstand hundreds of hours of high temperature use will be required. While not universally accepted, requirements for such heating elements may include any or all of the following: (i) a large geometric surface area for efficient heating of the gas stream, (ii) a low thermal mass to insure rapid heat-up, (iii) dependable operation at temperatures sufficient to achieve rapid gas heating into the 200°–300° C. preheat range, (iv) stability against oxidation and reduction at operating temperatures, and (v) thermal shock resistance and dimensional stability over the anticipated life of the element. Desirably, such elements should also be coatable by and non-poisoning with respect to one or more commercial catalysts, and should offer the capability of providing or supporting electrically insulating surfaces.

One of the disadvantages of utilizing an all-metal heating structure of the known cellular extruded type is the relatively large mass of metal needed to achieve structural and thermal integrity in the structure. The resulting high thermal mass means, at least for automotive applications, that a substantial amount of electric power is required to achieve effective preheating temperatures within the time interval (preferably less than 20 seconds and more preferably less than one second) considered acceptable by motorists. In addition, the resistance of extruded metal monoliths is somewhat difficult to control.

Wrapped corrugated steel or other metal preheater designs disadvantageously require the incorporation of electrically insulating coatings to avoid short circuiting, and the coatings are prone to loss or damage in use through vibration. In addition, at temperatures in the 700° C. range and above, corrugation straightening as well as drops in elastic modulus and yield strength occur in such structures, compromising the dimensional stability and rigidity of the product.

Preheater systems based on the application of conductive films to rigid ceramic substrates, while offering the potential of lower thermal mass, must confront the problem of long term thermal durability. The adverse chemical and physical factors found in a typical thermally cycled exhaust environment simply accentuate the problem of maintaining physical integrity in composite systems incorporating high expansion metal films on rigid low expansion ceramics.

Accordingly, it is a principal object of the present invention to provide heating elements and fluid heating apparatus incorporating those elements which offer a combination of good heating efficiency and good thermal durability.

It is a further object of the invention to provide a gas preheater suitable for use in a wide variety of effluent heating applications including automotive emissions control, diesel fume treatment, wood stove smoke conversion, industrial stacks emission control or the like, wherein the exhaust gas stream temperature at start may be too low to initiate rapid catalyst light-off.

Other objects and advantages of the invention will become apparent from the following description thereof.

SUMMARY OF THE INVENTION

The present invention employs flexible sintered ceramic sheet or tape to provide heating elements in the form of ceramic/metal laminates, these laminates being useful in the construction of heating apparatus for a wide variety of fluid heating applications. It has now been found that, when metal coatings or layers are applied to such sintered ceramics, the resulting composite materials exhibit excellent integrity and creep resistance to very high temperatures. Thus heaters employing these elements can offer important performance advantages in applications such as automotive exhaust treatment wherein both high temperature performance and mechanical stability are required.

Heating elements such as described offer an ideal approach for making flow-through heaters, since they can be provided as corrugated or otherwise crimped, laminated, rolled, stacked, and/or coated elements. These elements may be preformed or formed in the course of manufacture, thus offering a particularly broad range of heater design and manufacturing process options.

The basic building block of the fluid heaters of the invention, then, is an electrical heating element comprising a flexible metal foil or film bonded to at least one smooth flexible ceramic foil substrate. Variations upon this basic unit include multi-layer laminated elements comprising a plurality of ceramic foils and/or metal layers joined by lamination into an integral microlaminate. Other embodiments include bonded or laminated heating elements supporting catalytically active covering layers.

A flow-through heater for heating gases or other fluids constructed from these elements according to the invention is a ceramic/metallic honeycomb structure incorporating a plurality of open channels extending from one major surface of the structure to another major surface of the structure. The channels are formed or defined by one or more contacting combinations (pairs) of a crimped sheet and a base sheet, this type of honeycomb structure being well known for conventional ceramic or metallic honeycombs.

In the present construction, however, one or both of the crimped and base sheets in at least one layer of the structure are provided in the form of a laminated electrical heating element of the kind above described. Again, these elements may comprise one or a plurality of sintered ceramic foil substrate sheets or layers, the ceramic foils being coated or, more preferably, laminated with one or a plurality of electrically conductive metal layers. The number and thicknesses of the layers will determine in large part the degree of flexibility exhibited by the laminate.

The invention also includes a method for making a flow-through heater for gases or other fluids. In accordance with that method an electrically conductive ceramic/metallic heating element is made by laminating or otherwise bonding at least one electrically conductive metallic film or foil directly to at least one pre-sintered flexible ceramic foil substrate. By direct bonding is meant direct ceramic/metallic bonding without adhesive additives, such that the ceramic/metallic interface is substantially free of intermediary cementing or sealing material.

The heating element above described will be provided in the form of one or more structural elements for the heater, those elements taking the form of laminated crimped sheet, laminated base sheet, or both. Where the base sheet is a flat sheet, its final form is developed substantially as it is made. On the other hand crimped sheets, e.g., corrugated laminates, can be made by any of several methods. These include (i) preforming the ceramic foils as desired and then coating them or laminating them with preformed metal foils, (ii) shaping the ceramic foils and/or metal foil layers together in the course of the lamination process, and (iii) reforming the metal/ceramic laminate after coating and/or lamination have been completed.

Finally, the heating element shaped as desired is incorporated into a honeycomb structure. This honeycomb structure is conventionally formed by combining one or more crimped sheets and one or more base sheets into a layered structure, e.g., by stacking, rolling, or otherwise shaping one or more combinations (pairs) of a base sheet and a crimped sheet. In this case, however, the heating element is used to provide at least one of the crimped sheets and/or base sheets in one or more layers of the structure. The contacting crimped and base sheets form the desired plurality of open channels extending from one major surface of the stack to another major surface thereof, but with the heating element acting as an efficient heater for gases or other fluids passing through the channels.

Electrical leads or other electrical connector means providing electrical contact with the metal coating or foil layers in the laminated sheets present in the stack may be attached to those layers before or after construction of the honeycomb. These facilitate the application of electrical power to the heating elements in efficient and dependable fashion.

Honeycomb structures produced as described may, depending upon size and configuration, simply be encased in a suitable tight-fitting envelope or container and used without further processing. Alternatively, a suitable conventional bonding medium such as a solder or ceramic sealant may be applied to the crimped and/or base sheets of the honeycomb prior to stacking. A final bonding step, typically a heat treatment, can then be used to cement the stack into a bonded honeycomb structure which may be used with or without additional structural support.

Particular advantages of flow-through heaters produced as described include a very rapid heat-up response, due to the low thermal mass of the metallic/ceramic laminates used in heater construction. In addition, excellent stability against oxidation and/or reduction can be insured due to the wide range of materials and geometries available for use in forming these laminated structures.

The thermal shock resistance of the heaters can be very high, since the laminated heating elements can be sufficiently thin to easily relieve any thermal stresses by Euler buckling. Nevertheless, the creep resistance of the ceramic/metallic elements will substantially exceed that of the metal alone, due to the dimensional stability provided by the ceramic. And, the ceramic layers provide a very durable electrical insulation to the assembly.

Whether or not provided with supplemental catalysts as above described, the flowthrough preheaters of the invention will normally be mounted closely upstream of the main or conventional catalytic conversion unit in the exhaust conduit, to most efficiently provide the necessary heating of the stream to "light-off" temperature for the catalyst in the unit. For that purpose the preheater may be mounted in a separate container, or instead in the same container as the main catalyst unit.

In the latter case, if a ceramic honeycomb catalyst support is used, grooves or channels may be cut or otherwise provided in the upstream face of the main catalyst support, and a flexible preheater such as described then simply wound into the grooves or channels. In this manner the necessary support for the heating element may be provided by the main catalyst support, and any added cost for additional containers or supports for the preheater thereby avoided.

DESCRIPTION OF THE DRAWINGS

The invention may be further understood by reference to the drawing wherein.

DETAILED DESCRIPTION

Figure 1:
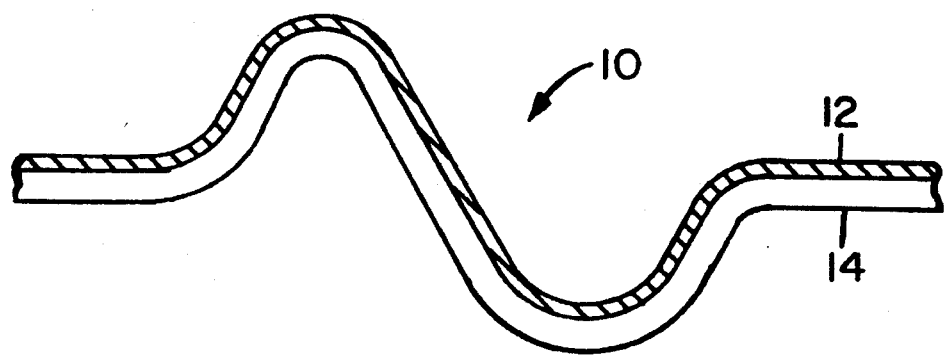
FIG. 1 is a flexible metallic/ceramic heating element incorporating a metal film conductive element in accordance with the invention.

A wide variety of polycrystalline ceramic materials may be used to provide flexible ceramic foil substrates useful for the construction of laminated heating elements in accordance with the invention. Thin flexible ceramic sheet and methods for making it are disclosed in U.S. Pat. No. 5,089,455. These ceramic foils, which can be made porous (up to about 60% porosity) or non-porous and which can be formed as narrow sheet (tape) or wide sheet, are pre-sintered ceramics which are thus substantially free of binders and other organics.

As a consequence of this pre-sintering, these ceramic foils exhibit little or no firing shrinkage in the course of preheater fabrication. This factor together with their refractoriness, flexibility and high strength, make them uniquely qualified as substrates for the application of metal coatings or foils. Reference to the aforementioned patent, which is expressly incorporated herein by reference, may be made for a further description of these preferred ceramics.

Specific examples of flexible ceramics which are preferred for heating element fabrication are alumina, zirconia, stabilized or partially stabilized zirconia, mullite, cordierite, magnesium aluminate spinel, crystallized calcium aluminosilicate glass frit (glass-ceramic powder), and mixtures of the above. Other examples include hafnia, silica, titania, spinel, chromium oxide, sialon, silicon or titanium carbides and/or nitrides, zircon, zirconium carbide, and titanium diboride. Ceramic foils consisting essentially or at least predominantly (more than 50% by weight) of these ceramics and ceramic mixtures will be particularly preferred.

As is well known, a variety of stabilizers may be present in the zirconia-based ceramics, including any of the well-known alkaline earth oxide and rare earth oxide stabilizers alone or in combination. In addition to the other single-phase ceramic systems of the above types, two- or multi-phase ceramics containing the above materials in any of a wide variety of combinations may also be used to provide sintered flexible ceramic foils.

As indicated, among the advantages of flexible ceramic foil substrates such as above described for heating element fabrication are very high strength and excellent surface quality. In particular, these foils exhibit superior surface flatness, a characteristic which enables them to be permanently bonded to a variety of metallic or other ceramic sheets by a low-pressure heat lamination step. This process is described and claimed in the co-pending patent application of T. D. Ketcham et. al. entitled "Microlaminated Composites", concurrently filed and commonly assigned herewith, to which reference may be made for a further description of such laminates.

A further advantage of the use of thin ceramic foils, as disclosed in the aforementioned Ketcham et. al. application, is that they can be rapidly reformed, after sintering but prior to laminating, with little or no change in physical properties. This reforming can efficiently provide corrugated or other shaped preforms for heating element fabrication which, after coating or interleaving with metallics, can be stacked and quickly consolidated to provide multilayer elements of curved or other complex shape.

The preparation of preformed ceramic foil involves heating the selected foil, e.g., to temperatures in the same range as useful for lamination thereof, and then applying pressure to the foil sufficient to permanently reshape it into a selected curvature. Unexpectedly and advantageously, this reforming can be carried out at very rapid strain rates, ie., strain rates above about $5\times10^{-3}$/second, which are not normally attainable with polycrystalline ceramic materials.

Materials useful to provide the conductive layers in heaters provided in accordance with the invention include metals, hard metals, and conductive ceramics. Examples of useful metals are platinum, ferrous alloys such as stainless steels, and high temperature corrosion resistant alloys such as Nichrome, Kanthal, Inconel, Hastalloy, and Monel alloys. Other metals or alloys which can withstand high temperature use may of course alternatively be employed, as may the so-called "hard metals". Specific examples of the latter include molybdenum disilicide and tungsten carbide.

In principle, conductive ceramics may also be employed in heating elements for the flow-through heaters of the invention. Specific examples of such ceramics include the conductive perovskites, nickel oxide, tin oxide, and silicon carbide.

While lamination constitutes a preferred method for bonding an electrically conductive metallic film or foil to pre-sintered flexible ceramic foil substrates, it is possible to use chemical or physical vapor deposition methods, such as metal-organic chemical vapor deposition, sputtering, or evaporation, to apply the metal layers as coatings. Alternative coating methods include direct chemical approaches such as electroless plating or the like.

Somewhat less preferred, but useful for the application of relatively thick (up to 50 micrometers) coatings, are metal powder pastes. These can be applied to ceramic foils and subsequently fired to metal films in the known manner, at relatively low cost. Of course, vapor deposition methods will normally be selected in preference to metal powder coating where very thin films, particularly of the precious metals such as platinum or platinum rhodium, are desired.

The metal or other conductive material may be provided as a layer which is substantially coextensive with the supporting ceramic substrate, or the conductor may instead be patterned in such a way as to increase the resistance of the element, ie., by lengthening the current path. Especially where the metal is to be applied to the substrate by a chemical or vapor deposition process rather than a lamination process, masking of the substrate can produce conductor patterns of essentially any complexity and resistance desired.

The thicknesses of the flexible ceramic foil substrates to be used for heating element fabrication in accordance with the invention typically fall in the range of 7–100 micrometers, more preferably 15–50 micrometers. Foil thicknesses in excess of 500 micrometers are to be avoided as insufficiently flexible, while foils thinner than about 4 microns are difficult to handle, offer no performance advantage, and can require the use of larger numbers of sheets to achieve a given level of strength in the product.

Thickness is particularly important where lamination is selected as the method for bonding the selected conductor layer to the flexible ceramic foil substrate. In general, thicker ceramic substrates require higher pressure consolidation in order to achieve permanent bonding of the metal to the ceramic, whereas flexible ceramic foil in the preferred thickness ranges can be permanently joined to metal foils, or to metal coatings deposited on ceramic foils, at relatively low pressures. With the preferred ceramics, it has been found that permanent bonding can be achieved by heating the ceramic foil substrate in contact with the selected metal foil or sheet at pressures as low as 1 kPa, and with pressures greater than 700 kPa seldom being required. Normally, pressures in the 4–50 kPa range are preferred.

The heating temperatures needed to achieve permanent lamination of the ceramic to the metal at these pressures are surprisingly low. In general, the temperature used will be below the lowest melting temperature of the metallic layer and the ceramic foil layer used to form the layered composite. By the lowest melting temperature is meant the lower of the respective melting temperatures of the ceramic foil and metal foil used. This permits bonding to be carried out without any gross deformation of either of the layered materials.

The minimum temperature for good bonding is presently considered to be a temperature approximately 300° C. below the lowest sintering temperature of the ceramic foil and metal foil. Again, by the lowest sintering temperature is meant the temperature corresponding to the lower of the respective minimum sintering temperatures of the ceramic foil and metal layer material used.

Preferably, lamination will be carried out at a lamination temperature TL within a preferred range of lamination temperatures as follows: $(T_{LS}-200)<T_L<T_{LM}$ wherein $T_{LS}$ and $T_{LM}$ are the lowest sintering and lowest melting temperatures, respectively, of the foil layers included in the composite structure.

The ready bonding of the metal and ceramic at these temperatures is presently attributed to the fact that ceramic sheet in the preferred thickness ranges, as compared to thicker sheet, is easier to bend elastically, develops higher stress at a given applied pressure, plastically deforms more rapidly through high temperature creep, and thus can more rapidly be brought into intimate bonding contact with a selected metal sheet. In these respects, the very high local thickness uniformity (local flatness) of these flexible ceramics is particularly important since relatively little plastic flow and deformation of the sheet is required to form a good bond against adjacent metallic surfaces.

An added optional feature of heating elements and flow-through heaters provided from ceramic sheet as described above involves the incorporation of catalytically active layers into the heater design. For example, in the case of preheaters for waste gas streams containing oxidizable pollutants such as carbon dioxide and unburned hydrocarbons, such catalyst layers can substantially improve overall system performance through very rapid catalyst light-off within the preheater itself. And, the resulting exotherm can significantly increase the heat output of the preheater to accelerate light-off in the main catalytic unit.

Examples of catalysts which can be applied as supplemental coatings to the ceramic/metal heating elements used in the preheaters include wash coatings of high surface area gamma alumina, lanthana beta alumina, zirconia, and ceria as well as zeolite-based coatings. Also useful are metal catalysts, including base metal catalysts as well as platinum, rhodium, ruthenium, palladium, and mixtures thereof.

The fabrication of flexible heating elements containing ceramic and metallic layers as above described is more fully shown by the following illustrative examples.

EXAMPLE 1

A flexible ceramic ribbon formed of partially stabilized zirconia and made in accordance with U.S. Pat. No. 5,089,455 is first provided. The ribbon is 2.5 cm long, 17 micrometers in thickness, and 3 mm wide, and is of yttria-stabilized (2 mole percent) zirconia composition. The zirconia powder used for ribbon fabrication is Tosoh TZ-2Y zirconia powder, commercially purchased from the Tosoh Chemical Co. of Tokyo, Japan.

The ribbon thus provided is provided with a conductive metal coating by a vapor deposition process. A film of platinum-rhodium alloy consisting of 98% platinum and 2% rhodium is deposited on the ceramic ribbon by r-f sputtering at ambient temperature. The thickness of the metal film is about 1.5 micrometers. The coated ribbon thus provided is then heated to 800° C. in order to insure homogenization, crystallization of the metal alloy, and good bonding to the ceramic ribbon. The product is a durable and flexible heating element.

A schematic illustration of the cross-sectional structure of the flexible heating element resulting from this coating process is provided in FIG. 1 of the drawing, the heating element 10 therein shown comprising a platinum-rhodium coating 12 disposed on a flexible stabilized zirconia substrate 14. As that Figure indicates, the heating elements may be either flat, as reflected by the shape of the end segments of element 10, or they may be curved as represented by the center segment thereof.

Heavy gauge copper leads are next affixed to element provided as described. Attachment of these leads is by means of a commercial silver paste, purchased as DuPont Conductor Composition #4817 from E. I. DuPont de Nemours of Wilmington, Del.

The resulting connectorized heating element can be cycled to a very high temperature without oxidation or delamination of the metallic film from the flexible ceramic substrate. To demonstrate this heating performance, the tape is repeatedly heated by the application of either AC or DC current to temperatures in excess of 1000° C. (red heat). The AC current is supplied from a 120 V line using a variable transformer to reduce the voltage level to about 5 volts. A regulated power supply (Lambda Electronics, model LQ531) is used to provide DC current to the element at a voltage of 5 volts and an amperage of about 3.3 A.

With either electrical power source, optical pyrometer readings indicate that temperatures of approximately 1100° C. are observed in the coated section of the element. Moreover, these temperatures are generally reached within one second of the initial application of electrical power to the element.

EXAMPLE 2

The procedure of Example 1 is repeated except that a corrugated rather than flat zirconia strip is used as a flexible ceramic substrate for the platinum alloy metallic layer. The corrugation of this substrate has a peak-to-peak amplitude of approximately 1.2 mm and a period of approximately 4.8 mm, this corrugation being produced by permanent plastic deformation of the strip between corrugated molding surfaces at a temperature of about 1400° C. and a pressure of about 7 kPa.

The platinum-rhodium coating is applied to this strip and measurements made on the resulting flexible heating element as described in Example 1. The heating element glows with orange color at an applied DC voltage of 4.5 V and a current of 2.75 A, again reaching its maximum temperature in approximately 1 second from the initial application of electrical power.

EXAMPLE 3

The procedure of Example 2 is repeated except that the thickness of the applied coating is reduced to about 0.1 micrometers. This thickness is in a preferred thickness range for these particular platinum-rhodium films, permitting rapid heating of the element at somewhat lower currents (e.g., 0.7 amperes at 12 volts). Thus such heating elements can readily be used to design fluid preheaters with total resistivities in the range of about 10–100 milliohms, a range which is presently preferred for automotive preheater applications.

EXAMPLE 4

A 5-layer laminated electrical heating element of corrugated structure is made by the high temperature bonding of multiple ceramic and metallic layers. Two flexible ceramic sheets of stabilized zirconia/alumina composition are alternately laminated between three layers of Series 410 stainless steel foil. The zirconia sheets consist of 80% $ZrO_2$ (containing 2 mole percent yttria stabilizer) and 20% alumina by weight, having a thickness of about 30 micrometers. The stainless steel foil has a thickness of about 51 micrometers.

These sheets are laminated by pressing between corrugated ceramic molding surfaces at a temperature of about 1400° C. under a pressure of about 4.5 kPa, these conditions being maintained for about 2 hours. The resulting laminated heating element has a length of about 5 cm and a width of about 5 mm. The corrugation has a peak to peak amplitude of about 3 mm and a peak to peak period of 2 cm.

Figure 2:
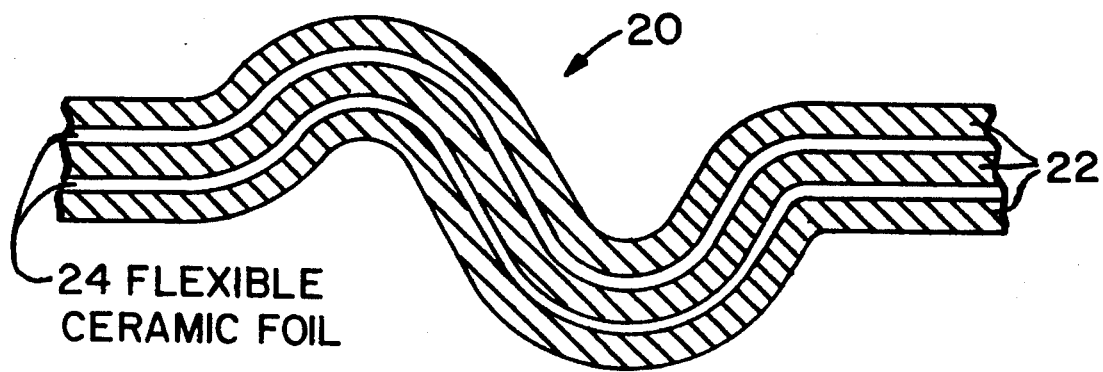
FIG. 2 is a flexible metallic/ceramic heating element formed of a laminate comprising flexible ceramic foil laminae bonded to conductive metal foil layers in accordance with the invention.

FIG. 2 of the drawing provides a schematic cross-sectional view of a laminated heating element 20 having the layer configuration of this Example 4, and wherein the relative positions of the permanently bonded steel layers 22 and ceramic layers 24 can be seen. Again, as reflected by the configuration of the end segments in the Figure, flat as well as curved laminated elements may be provided.

Electrical leads are attached to the 5-layer element of this Example by commercial silver paste, as in Example 1. The element is then connected to a Hewlett Packard D.C. power supply (Model #6256B) and heated by direct current. At a current level of 24 A and applied voltage of 2.3 volts, the heating element reaches a red-orange heat (about 700°–900° C.) in less than 10 seconds.

Some oxidation of the steel facing layers is observed following the first heating cycle, but no further visible degradation is observed during approximately twenty additional heating/cooling cycles. This characteristic of the heater may be modified simply by providing supplemental oxidation barriers, such as additional ceramic foil layers, over the exposed steel facing layers. Alternatively, the use of oxidation-resistant metals as outermost layers of the heater structure may be adopted.

As the above examples suggest, laminated or coated electrical heating elements such as described permit a large measure of control over the properties of the flow-through heater. Hence the various structural elements can be manufactured and assembled in a variety of ways to affect the structural rigidity, total resistivity, heating rate, and geometric surface area of the heater.

The conductive layers can be in an exposed configuration on the exterior surfaces of a selected ceramic substrate or multilayer ceramic/metal laminate as in the Examples, or they may be buried between opposing ceramic substrate sheets or as interior layers in a multilayer element. And, in the construction of a flow-through heater from any of these various types of heating elements, the latter can be incorporated into the heater structure as corrugated elements, as flat or curved base elements, or as both element types.

It will be quite evident from the foregoing description that not all structural elements of the heater assembly need be electrically powered. Thus supplemental crimped or base elements, whether of ceramic or metal, may additionally be included for structural rigidity, creep resistance, structural containment, or other functional purposes unrelated to the electrical heating function.

Figure 3:
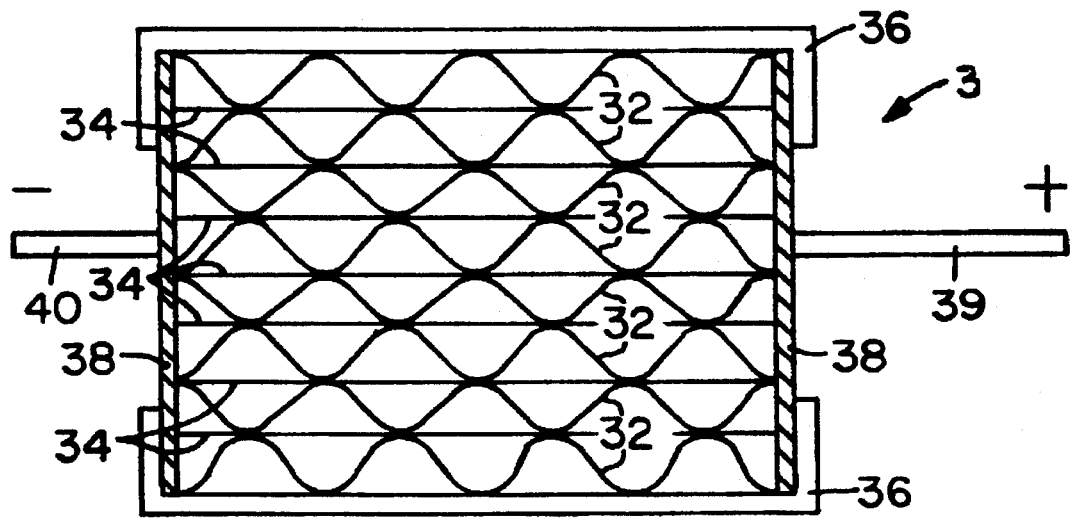
FIG. 3 schematically illustrates a first flow-through heater provided in accordance with the invention.
Figure 4:
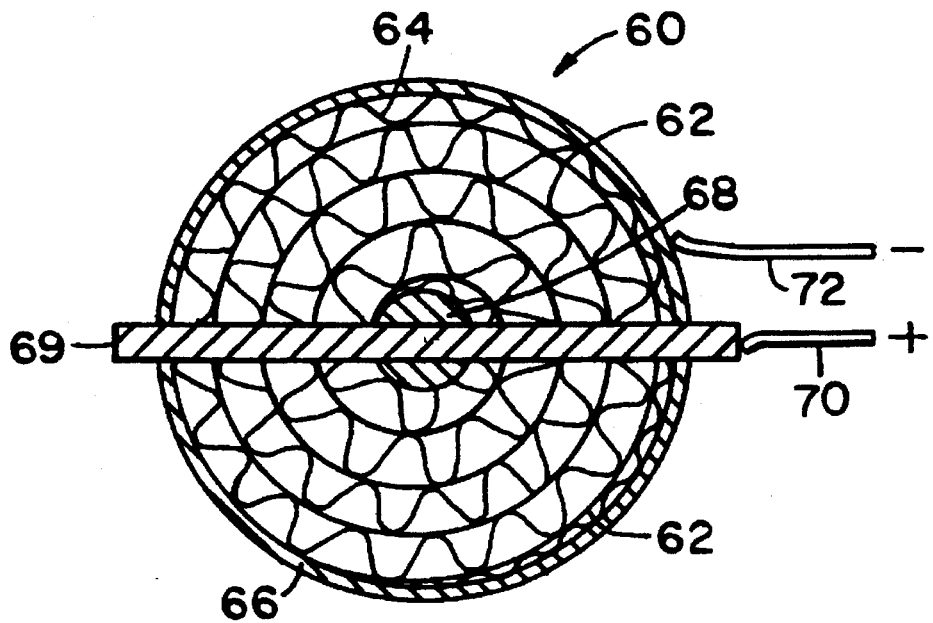
FIG. 4 schematically illustrates a second flow-through heater provided in accordance with the invention.

Specific examples of heater structures useful in accordance with the invention are shown in FIGS. 3 and 4 of the drawing. FIG. 3 shows a flow-through heater 30 comprising corrugated heating elements 32 and base elements 34 in a stacked assembly. Base elements 34 will typically be non-conducting sheets formed of a refractory ceramic composed, for example, of alumina and/or partially stabilized zirconia.

The corrugated heating elements 32 are multilayer sheets, each sheet consisting, for example, of a central ceramic foil substrate composed of the same ceramic to which metal foils or metal coatings, not shown, have been bonded. The metallic surface layers in each of the elements 32, which will be exposed to exhaust gases in the course of operation of the heater, are preferably composed of a refractory oxidation- and corrosion-resistant metal such as platinum or platinum-rhodium. These may be applied by lamination with thin foils of the selected metal, or by vapor deposition or other coating method as hereinabove described.

The heater core assembly of FIG. 3 formed by the combination of corrugated layers 32 and base layers 34 is contained as an integral structure between electrically insulating covering members 36 formed of an insulating ceramic material. Electrical connection to the ends of the conductive corrugated layers 32 is by means of conductive metal terminal plates 38, each of these plates being in physical and electrical contact with the metal coatings on layers 32. To apply electrical power to the core assembly via these plates 38, current leads 39 and 40 are connected to electrical power source, not shown. When made, these connections will permit the rapid heatup of low mass corrugated elements 32 and thus the efficient heating of gas passing through the channels formed between those elements and base layers 34.

A second design for a flow-through heater is illustrated in FIG. 4 of the drawing, which is a schematic cross-sectional view of a flow-through heater 60 having a spirally wound layered structure. That heater includes a flexible heating element in the form of base sheet 62 which is wound up in spiral fashion with flexible crimped sheet 64 to form a rolled heater core structure.

Crimped sheet 64 suitably consists of a corrugated non-conducting ceramic, while the flexible base sheet 62 (a heating element with details of layer structure omitted for clarity) comprises, for example, opposing ceramic facing layers of ceramic foil laminated with and permanently bonded to a conductive metal core layer. The ceramic foil may be composed, for example, of zirconia while the metal core layer may be composed of a Kanthal™ metal alloy sheet.

In the particular embodiment shown, flexible base sheet 62 forming the heating element is continuous from the center of the heater core to the outer layer thereof. Electrical contact to the outermost coil of sheet 62 is then made via the inner wall of outer cylindrical conductive metal enclosure 66, while electrical contact with the innermost coil of sheet 62 is made by metal core rod 68, the latter being electrically connected to metal retaining bar electrode 69.

In order to supply electrical power through conductive enclosure 66 and bar electrode 69 to the heater core (sheets 62 and 64), an electrical connection is made to a power source (not shown) via electrical leads 70 and 72 which are attached, respectively, to the bar electrode and enclosure. Upon the application of sufficient power to those leads, rapid and efficient heating of sheet 62, and thus of gases flowing through the channels formed by contact between sheets 62 and 64, is readily achieved.

As previously indicated, it may be useful to provide a catalyst-containing coating on any or all surfaces of the flow-through heaters of the invention to obtain more rapid initial conversion of constituents present in the exhaust stream to be heated by these units. Again, such coatings can be deposited only on the crimped sheet or only on the flat sheet, instead of on all internal surfaces of the assembly, depending upon the structure and intended mode of operation of the heater.

As shown by the foregoing examples, the rolled or stacked base sheets and crimped sheets may if desired be held in place solely by physical constraints encasing the sheet assemblies. Alternatively, conventional cementing or sealing methods may be used alone or in combination which physical encasement to permanently bond the sheet assemblies into unitary structures.

In methods employing a sealing approach, well-known ceramic cementing compositions (sealing frits) and cementing processes may be used. The cementing or sealing compositions may comprise powdered glass formulations for low and moderate temperature applications, or devitrifiable glass (glass-ceramic) powders for high temperature use.

While the invention has been particularly described above with respect to specific heating elements, heaters, and methods, it will be recognized that those specific examples are presented for purposes of illustration only and are not intended to be limiting. Thus numerous modifications and variations upon the specific materials and procedures described herein may be resorted to by those skilled in the art within the scope of the appended claims.

What is claimed is:

1. A flow-through fluid heater comprising a ceramic/metallic honeycomb structure incorporating a plurality of open channels extending from one surface of the structure to another surface of the structure, the channels being defined by at least one combination of at least one crimped sheet and one base sheet, wherein:

at least one of the sheets is a flexible laminar electrical heating element comprising at least one flexible sintered ceramic foil layer bonded to at least one electrically conductive layer.

2. A fluid heater in accordance with claim 1 wherein the laminar electrical heating element comprises a sheet of metal foil directly bonded to at least one sheet of flexible sintered ceramic foil.

3. A fluid heater in accordance with claim 2 wherein the metal foil layer is laminated between opposing flexible sintered ceramic foils.

4. A fluid heater in accordance with claim 2 wherein the metal foil has a composition selected from the group consisting of platinum, ferrous alloys, and high temperature corrosion resistant alloys.

5. A fluid heater in accordance with claim 1 wherein the laminar electrical heating element comprises a flexible sintered ceramic foil having a refractory metal coating deposited directly thereon.

6. A fluid heater in accordance with claim 1 wherein a catalyst layer is provided on a surface of the laminar electrical heating element.

7. A fluid heater in accordance with claim 1 wherein the sintered ceramic foil consists at least predominantly of a ceramic composition selected from the group consisting of alumina, zirconia, stabilized zirconia, partially stabilized zirconia, mullite, cordierite, magnesium aluminate spinel, crystallized calcium aluminosilicate glass, hafnia, silica, titania, spinel, chromium oxide, sialon, silicon carbide, titanium carbide, silicon nitride, titanium nitride, zircon, zirconium carbide, titanium diboride, and mixtures thereof.

8. A fluid heater in accordance with claim 6 wherein the sintered ceramic foil has a composition selected from the group consisting of stabilized zirconia and partially stabilized zirconia, and wherein the composition contains a zirconia stabilizer selected from the group consisting of alkaline earth oxide stabilizers and rare earth oxide stabilizers.

9. A fluid heater in accordance with claim 1 wherein the conductive layer has a composition selected from the group consisting of metals, hard metals, and conductive ceramics.

10. A method for making a flow-through fluid heater which comprises the steps of:

bonding at least one electrically conductive metallic film or foil to at least one pre-sintered flexible ceramic foil substrate by hot pressing at a pressure in the range of 1–700 kPa and at a temperature below the lowest melting temperature of the ceramic foil and metallic foil to provide a flexible, electrically conductive ceramic/metallic heating element;

forming the heating element into at least one of a crimped sheet and a base sheet;

incorporating the thus-formed heating element into a honeycomb structure which includes a plurality of open channels formed by one or more contacting combinations of a crimped sheet and a base sheet, said channels extending from one surface of the structure to another surface of the structure.

11. A method in accordance with claim 10 wherein the ceramic foil substrate has a thickness not exceeding about 100 micrometers.

12. A method in accordance with claim 11 wherein the pressure is in the range of about 4–50 kPa.

13. A method in accordance with claim 12 wherein hot pressing is carried out at a lamination temperature $T_L$ which has a value within the range defined by the equation:

$$(T_{LS}-200) < T_L < T_{LM}$$

wherein $T_{LS}$ and $T_{LM}$ are, respectively, the lowest sintering temperature and the lowest melting temperature of the ceramic foil and metallic foil.

14. A laminated electrical heating element comprising at least one conductive metal foil layer bonded directly by pressure lamination to at least one substrate or covering layer composed of a flexible sintered ceramic foil, the ceramic foil having a thickness not exceeding about 100 micrometers and lamination being carried out by hot pressing at a pressure in the range of 1–700 kPa and at a temperature below the lowest melting temperature of the ceramic foil and metallic foil.

15. A method for making a flexible electrical heating element which comprises the step of laminating a layer of a flexible sintered ceramic foil directly to a conductive metal foil layer, lamination being carried out by hot pressing at a pressure in the range of 1–700 kPa at a temperature which is below the melting temperatures of the metal foil layer and flexible ceramic foil.

* * * * *